United States Patent
Kachnowski

(10) Patent No.: US 11,110,838 B2
(45) Date of Patent: Sep. 7, 2021

(54) ARMREST FOR A MOTOR VEHICLE

(71) Applicant: Kiekert AG, Heiligenhaus (DE)

(72) Inventor: John Kachnowski, Wixom, MI (US)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 16/697,514

(22) Filed: Nov. 27, 2019

(65) Prior Publication Data

US 2021/0155133 A1    May 27, 2021

(51) Int. Cl.
  *B60N 2/75*    (2018.01)
(52) U.S. Cl.
  CPC ...................... *B60N 2/78* (2018.02)
(58) Field of Classification Search
  CPC .......... B60N 2/75; B60N 2/763; B60N 2/767; B60N 2/77; B60N 2/78
  USPC ....................................................... 296/1.09
  See application file for complete search history.

(56) References Cited

U.S. PATENT DOCUMENTS

| 4,619,478 | A | * | 10/1986 | Heimnick | B60N 2/78 296/153 |
| 8,403,416 | B2 | * | 3/2013 | Muck | B60N 2/753 297/411.32 |
| 10,543,768 | B2 | * | 1/2020 | Richards | B60N 2/797 |
| 2005/0093305 | A1 | * | 5/2005 | Jackson | E05B 77/265 292/216 |

FOREIGN PATENT DOCUMENTS

| DE | 20120959 | U1 |   | 4/2003 |   |
| DE | 102006026838 | A1 |   | 12/2007 |   |
| DE | 102017113528 | A1 |   | 12/2018 |   |
| JP | H01138827 | U | * | 9/1989 |   |
| JP | 2007253673 | A | * | 10/2007 |   |
| JP | 2008308163 | A | * | 12/2008 | ............... B60N 2/78 |
| JP | 2010089682 | A | * | 4/2010 |   |
| KR | 20100056088 | A | * | 5/2010 |   |

* cited by examiner

*Primary Examiner* — Jason S Morrow
*Assistant Examiner* — Kevin P Weldon
(74) *Attorney, Agent, or Firm* — Renner, Otto, Boisselle & Sklar, LLP

(57) ABSTRACT

An armrest for a motor vehicle, in particular a motor-vehicle side door armrest. In its general structure, the armrest has a stationary base part and a supporting part that is movable relative thereto, and additionally has a motor-driven adjusting device for the supporting part. The adjusting device comprises an electric motor and an eccentric that can be acted upon by the motor. The electric motor is configured as a component of a linear actuator connected to the eccentric.

17 Claims, 3 Drawing Sheets

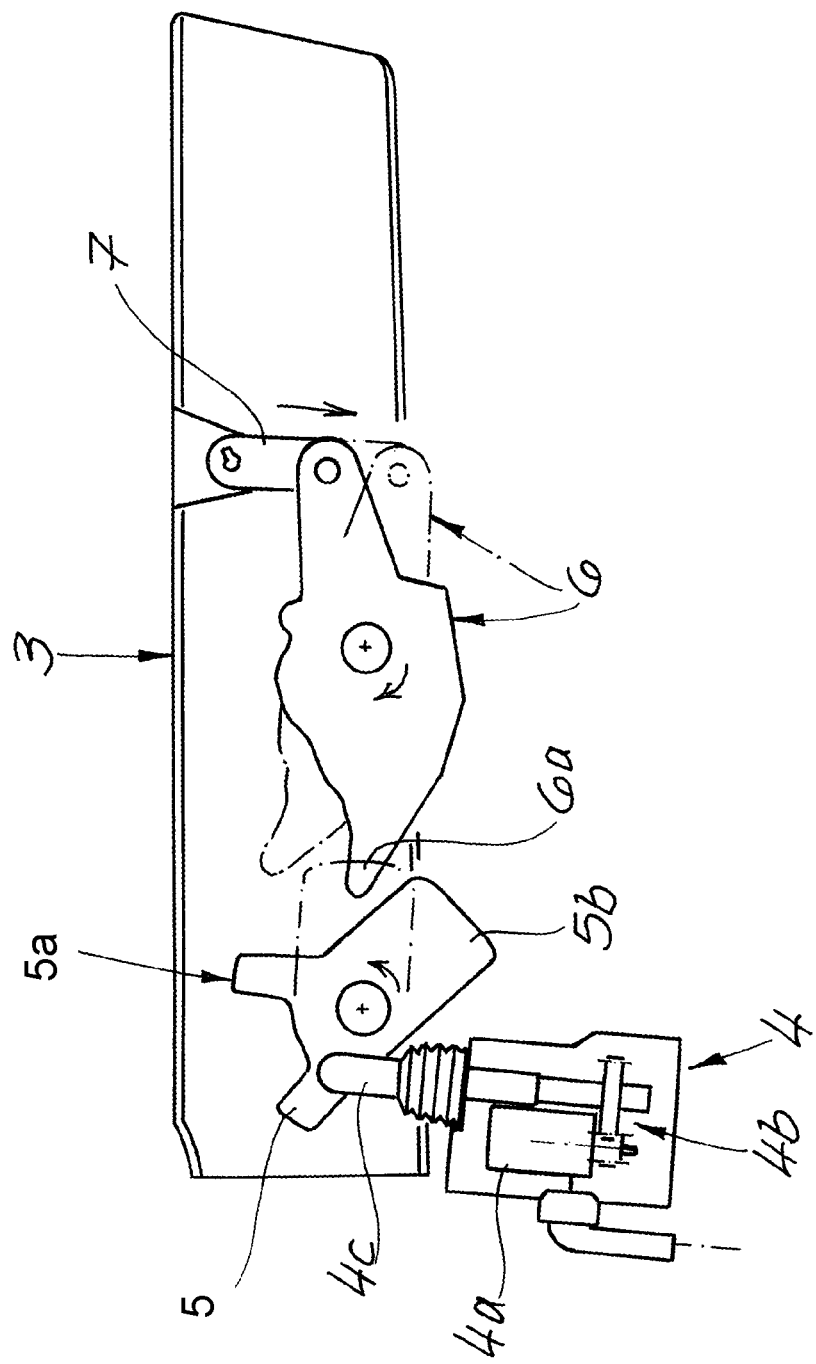

ARMREST FOR A MOTOR VEHICLE

The invention relates to an armrest for a motor vehicle, in particular a motor-vehicle side door armrest, comprising a stationary base part and a supporting part that is movable relative thereto, and comprising a motor-driven adjusting device for the supporting part, the adjusting device comprising an electric motor and an eccentric that can be acted upon by said motor.

Armrests for motor vehicles are known both in so-called singular configurations and also as attachments in the interior of an associated motor vehicle. A singular configuration is found in pilot seats or also armrests directed towards the interior, for example. By contrast, armrests designed as attachments are often impressed into or onto interior door cladding of an associated motor-vehicle door. Reference is then made to a motor-vehicle side door armrest, i.e. an armrest in or on a motor-vehicle side door.

In addition to the option of it being possible to manually adjust the armrest in question manually for reasons of comfort, motor-driven solutions are also known from the prior art, by means of which the supporting part can be moved relative to the base part. In this case, the movement is typically carried out transversely to the longitudinal extension of the supporting part, in order to ultimately provide a height-adjustable support for an operator's elbow, for example. A solution of this kind is described in DE 201 20 959 U1 by the applicant, for example.

For this purpose, the known armrest has an adjusting device, which is designed as a scissor jack. A scissor jack of this kind has a relatively complex and expansive structure. In addition, separate development of the structure is required, and therefore existing or available adjusting devices cannot be drawn upon.

A comparable situation applies to the generic teaching according to DE 10 2006 026 838 A1. In this case, too, this is an adjustable armrest for a motor vehicle. In this case, an armrest part is adjusted by using at least one eccentric. For this purpose, the eccentric comprises an eccentric disc that is rotatable about a vehicle-fixed axis. Therefore, the eccentric and an associated motor are predominantly oriented in the longitudinal direction of the vehicle, and this again complicates the use of standardized components and the installation. Here, the invention is attempting to find a remedy for all of the above.

The technical problem addressed by the invention is to develop an armrest for a motor vehicle and in particular a motor-vehicle side door armrest such that the installation is simplified and standardized adjusting devices can advantageously be used.

In order to solve the stated technical problem, in the context of the invention, a generic armrest for a motor vehicle is characterized in that the electric motor is designed as a linear actuator connected to the eccentric.

According to the invention, the motor-driven adjusting device for the supporting part is substantially composed of the linear actuator and the eccentric. While the eccentric is a component that is adapted to the specific intended purpose and the installation arrangement corresponding thereto, an actuator that is also suitable for other intended purposes can also be used as the linear actuator. In fact, for example, a linear actuator is suitable such as that which is described in DE 10 2017 113 528 A1 by the applicant by way of example and in a non-limiting manner and is used in the example to close/open the locking mechanism of a motor vehicle door latch. Furthermore, comparable linear actuators are known as window regulators or in conjunction with fuel filler flaps or charging flaps and the locking thereof. In any case, linear actuators of this kind are used in many different ways in or on motor vehicles.

According to the invention, the present application now draws upon a conventional or standardized linear actuator of this kind, by means of which the eccentric is acted upon. For this purpose, the eccentric is connected to the linear actuator. Usually, an adjusting lever is additionally provided, on which the eccentric acts. The adjusting lever may in turn comprise a linked thrust member connected to the supporting part.

In this way, adjusting movements of the linear actuator are ultimately transferred to the adjusting lever via the eccentric, and from the adjusting lever to the supporting part via the thrust member, such that adjusting movements of the linear actuator ultimately result in movements of the supporting part relative to the base part as both components of the armrest. These movements generally result in the supporting part performing a lifting movement relative to the base part. In this way, the motor-driven adjusting device for the supporting part can be produced and implemented particularly cost-effectively and in a simple manner in terms of installation.

The feature of the invention whereby the linear actuator and the eccentric are connected to a shared retaining element additionally makes a contribution here. The retaining element is in turn designed as a retaining plate that can be connected to interior door cladding and/or to an interior door panel. The retaining element or the retaining plate is predominantly made of plastics material in this case.

In this way, there is the option of the adjusting device and the retaining element that receives the adjusting device together defining an installation module. This installation module may be connected to interior door cladding and/or an interior door panel. In this case, as generally standard, the installation module denotes a replaceable, closed functional unit. In order for it to be possible to thus move the supporting part relative to the base part, it is only necessary for the installation module to be fastened to the interior door cladding and/or interior door panel and for the thrust member to then be connected to the supporting part.

The linear actuator in turn comprises a spindle drive connected to the electric motor. The spindle drive may in turn be equipped with a spindle rod that is rotatably connected to the eccentric. The output-side linear adjusting movements of the linear actuator are transferred to the supporting part via the spindle rod. As a result, the supporting part may for example be adjusted in its height or its distance from the base part until an operator is content with the positioning.

As a result, an armrest for a motor vehicle is provided which provides a particularly simply constructed and functionally reliable adjusting device for the supporting part. Here, the invention proceeds from the knowledge that, for providing the movability of the supporting part, a linear actuator can advantageously be used which is also used in conjunction with other adjusting functions in motor vehicles frequently and in large numbers. As a result, linear actuators of this kind are provided particularly cost-effectively and with a robust design. In order to complete the desired adjusting device in this way, the linear actuator acts on the eccentric and potentially an additional adjusting lever, which acts on the supporting part via a thrust member connected thereto. Accordingly, a simply constructed adjusting device for the supporting part that is cost-effective to produce is provided, which can also be installed easily and rapidly. These are considered to be the essential advantages.

The invention is explained in greater detail in the following with reference to drawings, which show just one embodiment. In the drawings:

FIG. 3 is the subject matter according to FIG. 1, depicted without retaining plate.

Figure 1:
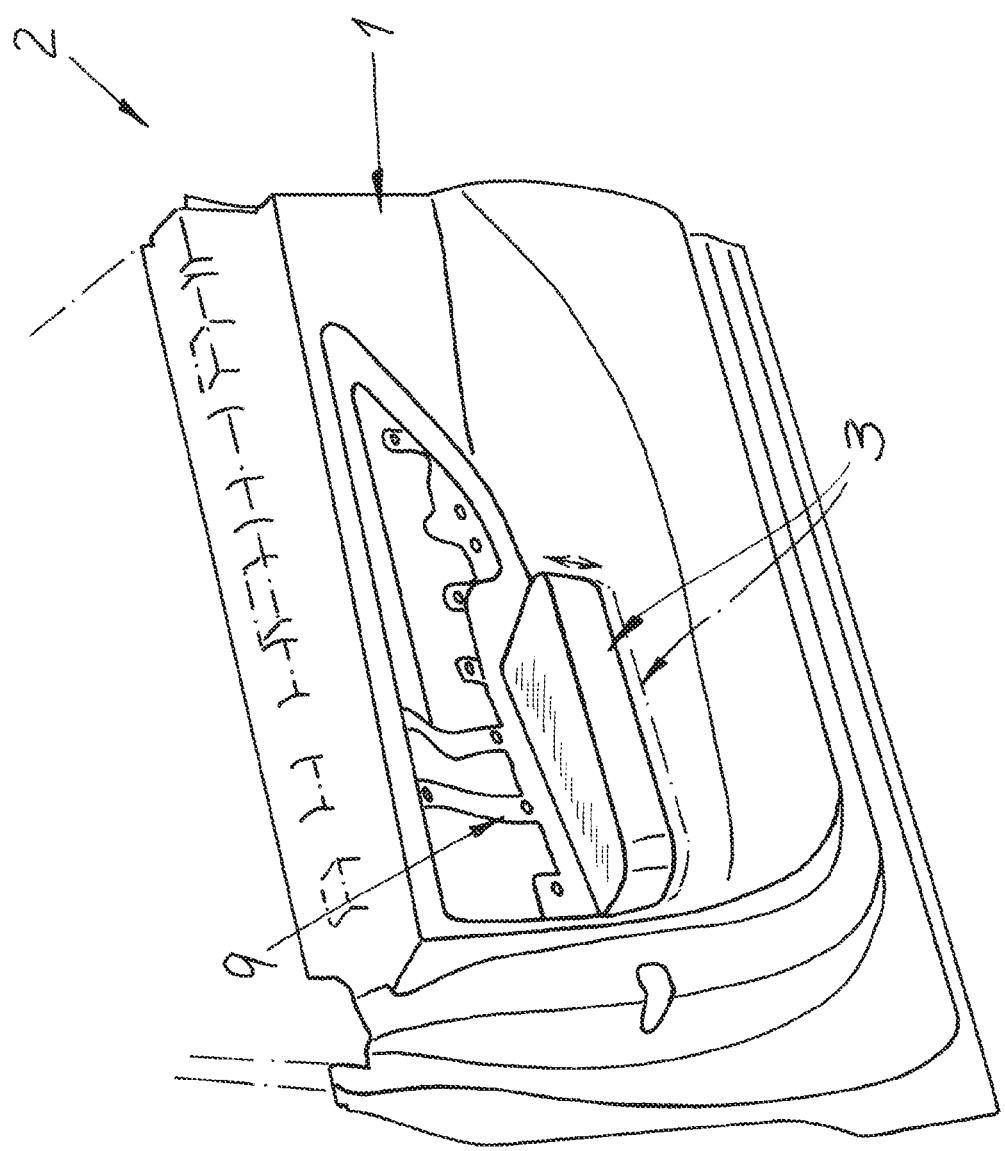
FIG. 1 is an interior view at a motor vehicle side door.
Figure 2:
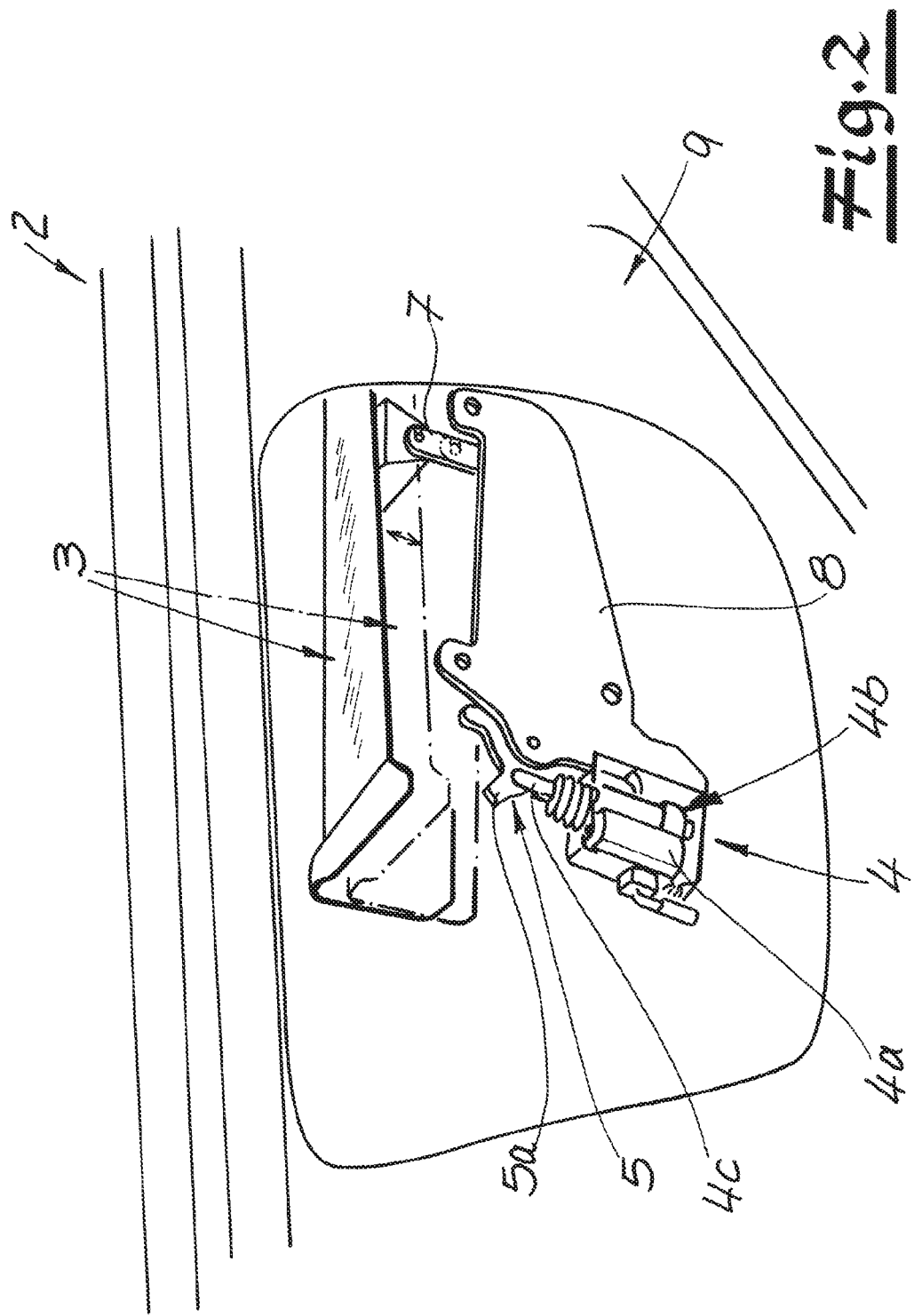
FIG. 2 is a rear view of the armrest according to the invention.

The drawings show an armrest for a motor vehicle. Specifically, the armrest is a motor-vehicle side door armrest. This means that, according to the embodiment, the armrest in question is provided and produced in interior door cladding 1 of an associated motor-vehicle door 2. The motor-vehicle door 2 is a motor-vehicle side door 2. For this purpose, the armrest is composed of a stationary base part 1 and a supporting part 3 that is movable relative thereto. According to the embodiment, the base part 1 coincides with the interior door cladding 1 or is formed thereon.

The supporting part 3 is movable relative to the base part 1. For this purpose, a motor-driven adjusting device 4, 5, 6, 7 is produced, which can be seen in particular in FIG. 3. According to the embodiment, the adjusting device 4, 5, 6, 7 comprises an electric motor 4a and an eccentric 5 that can be acted upon by said motor.

It can be seen in particular from FIG. 3 that the electric motor 4a is designed as a component of a linear actuator 4 connected to the eccentric 5. The linear actuator 4 is composed not only of the electric motor 4a, but also of a spindle drive 4b connected to the electric motor 4a. Lastly, the linear actuator 4 also has a spindle rod 4c. The spindle rod 4c is rotatably connected to the eccentric 5 already mentioned above and is provided on the output side of the spindle drive 4b.

The linear actuator 4 comprising the electric motor 4a, the spindle drive 4b acted upon by the electric motor 4a, and the spindle rod 4c lastly acted upon on the output side by the spindle drive 4b, is a drive or actuator which is used in or on a motor vehicle in large numbers and also in different fields of application. For example, linear actuators 4 of this kind are alternatively also used as closing/opening drives for the locking mechanism of a motor-vehicle door latch. In addition, linear actuators 4 are known in conjunction with window regulators, tank locks, hatch and hood locks, etc. Mirror adjustments, seat adjustments, etc., are also produced and implemented using linear actuators 4 of this kind.

According to the invention, a linear actuator 4 of this kind can now be used in a practically unaltered manner to ensure, via the eccentric 5, that the supporting part 3 adopts a desired position relative to the base part 1 as a component of the movable armrest. For this purpose, the linear actuator 4 and the eccentric 5 are connected to a shared retaining element 8. In this case, the retaining element 8 in question not only receives the linear actuator 4 and the connected eccentric 5, but also, according to the embodiment, an adjusting lever 6 interacting with the eccentric 5 and lastly a thrust member 7 that is connected to the adjusting lever 6 and acts on the supporting part 3. According to the embodiment, the retaining element 8 is a retaining plate 8 made of plastics material, which can be connected to the interior door cladding 1 or to an interior door panel 9 of the motor-vehicle door 2.

In this case, the design is such that the adjusting device 4, 5, 6, 7 and the retaining element that receives the adjusting device 4, 5, 6, 7 or the retaining plate 8 taken as a whole define an installation module 4, 5, 6, 7; 8 that can be connected to the interior door cladding 1 and/or the interior door panel 9 of the motor-vehicle door. This installation module 4, 5, 6, 7; 8 is first connected or joined to the interior door cladding 1 and/or the interior door panel 9. Subsequently, it is only still necessary for the thrust member 7 to be coupled to the supporting part 3, in order to thus make it possible to move the supporting part 3 relative to the base part 1 as desired by means of the adjusting device 4, 5, 6, 7.

It can be seen from FIG. 3 that the eccentric 5 is rotatably mounted on the retaining element or retaining plate 8. The same applies to the adjusting lever 6. In order to keep the weight low at this point, the eccentric 5 and the adjusting lever 6 as well as the retaining element or retaining plate 8 are furthermore and advantageously made of plastics material.

In addition, the design is such that the eccentric 5 comprises two arms 5a and 5b, which, depending on the actuation thereof, interact with a lug 6a on the adjusting lever 6. As a result, an end of the adjusting lever 6 which is opposite the lug 6a of the adjusting lever 6 relative to a central axis of rotation is moved linearly by means of the thrust member 7 connected thereto, as shown by an arrow in FIG. 3. Since the movable supporting part 3 is connected to the thrust member 7, this results in a corresponding movement of the supporting part 3 relative to the base part 1, specifically in the sense of a predominantly vertically oriented lifting movement.

In the embodiment according to FIG. 3, a pivoting movement of the eccentric 5 that is initiated by means of the linear actuator 4 about the axis of said eccentric in the counterclockwise direction corresponds to the fact that the arm 5b interacts with the lug 6a and the adjusting lever 6 pivots as whole in the clockwise direction, such that the thrust member 7 together with the supporting part 3 is moved backwards. Conversely, a movement of the eccentric 5 in the clockwise direction ensures that, in this case, the arm 5a of the eccentric 5 moves against the lug 6a of the adjusting lever 6 such that the adjusting lever 6 performs a movement in the counterclockwise direction as a result. Therefore, the thrust member 7 together with the supporting part 3 moves upwards relative to the base part 1.

LIST OF REFERENCE SIGNS

Interior door cladding 1
Base part 1
Motor-vehicle door 2
Supporting part 3
Linear actuator 4
Electric motor 4a
Spindle drive 4b
Spindle rod 4c
Adjusting device 4, 5, 6, 7
Installation module 4, 5, 6, 7; 8
Eccentric 5
Adjusting lever 6
Thrust member 7
Retaining element 8
Retaining plate 8
Interior door panel 9

The invention claimed is:

1. An armrest for a motor vehicle, the armrest comprising:
   a stationary base part
   a supporting part that is movable relative to the stationary base part;
   a motor-driven adjusting device for the supporting part, the adjusting device comprising an electric motor and an eccentric that is acted upon by the motor, wherein the electric motor is configured as a component of a linear actuator connected to the eccentric, wherein linear movement of the linear actuator is translated to rotational movement of the eccentric; and an adjusting lever connected between the eccentric and the supporting part for translating the rotational movement of the eccentric to a lifting movement of the supporting part that occurs subsequently to an initial range of rotation of the eccentric.

2. The armrest according to claim 1, wherein the linear actuator and the eccentric are connected to a shared retaining element.

3. The armrest according to claim 2, wherein the retaining element is connectable to interior door cladding and/or to an interior door panel.

4. The armrest according to claim 2, wherein the retaining element is made of plastics material.

5. The armrest according to claim 1, wherein the adjusting lever comprises a linked thrust member connected to the supporting part.

6. The armrest according to claim 2, wherein the adjusting lever is connected to the retaining element.

7. The armrest according to claim 2, wherein the adjusting device and the retaining element that receives the adjusting device define an installation module are connectable to the interior door cladding and/or the interior door panel.

8. The armrest according to claim 1, wherein the linear actuator comprises a spindle drive connected to the electric motor.

9. The armrest according to claim 8, wherein the spindle drive is equipped with a spindle rod that is rotatably connected to the eccentric.

10. The armrest according to claim 1, wherein the eccentric and the adjusting lever are mounted to a same side of a retaining element.

11. The armrest according to claim 10, wherein each of the eccentric and the adjusting lever is pivotally mounted to the retaining element by a fixed pivot axis for movement about the corresponding fixed pivot axis.

12. The armrest according to claim 10, wherein the eccentric and the adjusting lever are rotatable in a plane that is parallel with a plane in which the retaining element is arranged.

13. The armrest according to claim 1, wherein the eccentric and the adjusting lever are disengageable prior to rotation of the eccentric.

14. The armrest according to claim 1, wherein each of the eccentric and the adjusting lever has a non-symmetrical shape.

15. The armrest according to claim 5, wherein the linked thrust member is connected to the supporting part at a first end of the adjusting lever that is opposite to a second end of the adjusting lever that is engageable by the eccentric.

16. The armrest according to claim 15, wherein the linear actuator engages the eccentric at a first end of the eccentric that is opposite to a second end of the eccentric that is engageable with the second end of the adjusting lever.

17. The armrest according to claim 15, wherein a rotational axis of the adjusting lever is arranged between the first end and the second end.

* * * * *